(12) United States Patent
Wagener et al.

(10) Patent No.: US 7,858,710 B2
(45) Date of Patent: Dec. 28, 2010

(54) HIGHLY ORGANIZED POLYOLEFIN STRUCTURES

(75) Inventors: Kenneth Boone Wagener, Gainesville, FL (US); Travis W. Baughman, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 12/298,584

(22) PCT Filed: Apr. 23, 2007

(86) PCT No.: PCT/US2007/067187

§ 371 (c)(1),
(2), (4) Date: Aug. 7, 2009

(87) PCT Pub. No.: WO2007/127690

PCT Pub. Date: Nov. 8, 2007

(65) Prior Publication Data

US 2009/0306319 A1    Dec. 10, 2009

Related U.S. Application Data

(60) Provisional application No. 60/794,616, filed on Apr. 25, 2006.

(51) Int. Cl.
*C08G 61/06* (2006.01)
*C08F 8/04* (2006.01)
*C08F 220/28* (2006.01)
*C08F 4/80* (2006.01)

(52) U.S. Cl. ............... 525/328.9; 525/329.5; 525/338; 525/919; 526/309; 526/320

(58) Field of Classification Search ............. 525/328.9, 525/329.5, 338, 919; 526/309, 320
See application file for complete search history.

(56) References Cited

U.S. PATENT DOCUMENTS 7,402,642 B2 *   7/2008   Baugh et al. ............. 526/316

OTHER PUBLICATIONS

Drouin, et al, Multiple Tandem Catalysis: Facile Cycling between Hydrogenation and Metathesis Chemistry, Organometallics, 20(26), 5495-5497, 2001.*
Schwendeman, John E., et al., "Modeling Ethylene/Methyl Methacrylate and Ethylene/Methacrylic Acid Copolymers Using Acyclic Diene Metathesis Chemistry," *Macromolecules*, Jun. 1, 2004, pp. 4031-4037, vol. 37, No. 11.

* cited by examiner

*Primary Examiner*—Fred M Teskin
(74) *Attorney, Agent, or Firm*—Saliwanchik, Lloyd & Saliwanchik (57) ABSTRACT

A method of preparing periodic, semi-periodic, or semi-random polyethylene-co-acrylic acid or polyethylene-co-methacrylic acid involves polymerizing 1-alkoxyalkyl ester substituted α,Ω-dienes, and/or 1-alkoxyalkyl ester substituted cycloalkenes via olefin metathesis reactions followed by hydrogenation of the alkylene units and subsequently hydrolyzed to the desired polyethylene-co-acrylic acid or polyethylene-co-methacrylic acid. The polyethylene-co-acrylic acid or polyethylene-co-methacrylic acid can then be converted to ionomers by exchange with a monomeric carboxylate salt.

14 Claims, 6 Drawing Sheets

Nucrel – EAA copolymer

EAA21 – acid copolymer

Surlyn – EAA Ionomer

EAA21Zn50 – first attempt

FIG. 6

HIGHLY ORGANIZED POLYOLEFIN STRUCTURES

FIELD OF THE INVENTION

This invention relates to polyethylene copolymers. More particularly, the invention relates to the preparation of regular poly(ethylene-co-acrylic acid) and poly(ethylene-co-methacrylic acid) and related compositions of matter.

BACKGROUND OF THE INVENTION

Copolymers, such as ethylene-acrylic acid (EAA) and ethylene-methacrylic acid (EMAA) copolymers, which are prepared by chain polymerization have been widely used as commodity plastics due their ease of production, inexpensive starting materials, and the tunable bulk morphology of final products. The interplay of hydrogen bonding and polymer crystallinity permits the synthesis of wide variety of materials displaying various bulk properties dependant on acid content and degree of branching. For example, commercial EAA copolymer synthesis, is performed by a radically initiated, high-pressure polymerization, and results in the preparation of statistically functionalized copolymers which meet certain desired material properties. However, because of chain transfer side reactions, uncontrollable polymer branching occurs and, because of the essentially random nature of the copolymerization, the incorporation of acid functionality reside in backbone in a statistical fashion. This statistical polymerization is given in the chemical equation, Equation 1, below.

Equation 1

As the sophistication of applications for polymers evolves, the need for well defined polymer microstructures ensues. For these applications, the methods of polymer synthesis must extend beyond the random placement of repeating units common to most chain growth copolymerizations of vinyl monomers. Vinyl copolymerizations, even when perfectly alternating, have significant restrictions to the number of covalently bonded carbon atoms between specific functionalized carbons, almost always three carbon atoms. The homopolymerization of functionalized dienes can also lead the structures equivalent to the alternating copolymerization of vinyl monomers, shown in Equation 2 below. This was reported for poly(ethylene-alt-methylmethacrylate) in Yokota, K. and Hirabayashi, T. *Macromolecules* 1981, 14, 1613-1616 which also reported the alternating copolymerization of a vinyl monomer and a diene monomer to give a poly(butadiene-alt-methylmethacrylate) with five carbon atoms between acid functionalized carbons, shown in Equation 3 below.

Equation 2

Equation 3

Ring-opening polymerizations of specifically functionalized cycloalkene monomers also give limited possibilities to the placement of specific units on the resulting chains as the ability to prepare a cyclic monomer becomes very difficult and usually prohibitively expensive when the size of the ring exceeds seven or eight atoms.

To overcome such limitations with EAA and EMAA, metathesis polymerization has been applied. The ring opening metathesis copolymerization, ROMP, of a carboxylic acid functionalized cyclooctene with cyclooctene and subsequent hydrogenation of the double bounds of the polymer formed upon olefin metathesis has been reported in Lehman, S. E. and Wagener K. B. ADMET Polymerization. In *Handbook of Metathesis*, Grubbs, R. H., Ed. Wiley-VCH: 2003; Vol. 3, pp 283-353. The successful preparation of copolymers between 2-10 mol % was achieved by the copolymerization and subsequent hydrogenation of an acid functionalized cyclooctene, as shown in Equation 4 below. These materials were isolated as high-melting, semicrystalline solids, as expected, affording strictly linear materials exhibiting varying levels of crystallinity dependent on comonomer incorporation. Although these polymers did not have the methyl groups and other branched alkyl groups and a statistical amount of acid functionalized carbons in the backbone separated by only one methylene unit, typical of commercially produced EAA and EMAA copolymers, the properties were essentially identical due to the random incorporation of cyclooctene and acid functionalized cyclooctene units.

Equation 4

The acyclic diene metathesis polymerization, ADMET, of a free acid diene has been reported in Schwendeman, J. E. and Wagener K. B. *Macromolecules* 2004, 37, 4031-4037 as indicated in Equation 5, below. In this polymerization the exothermic ring-opening which occurs with cyclooctene copolymerization is not involved and the polymerization proceeded at a very low rate permitting the competitive deactivation of the metathesis catalyst by the acid groups in the polymerization mixture, which under normal polymerization conditions for ADMET only low molecular weight oligomers resulted. Only by periodic addition of metathesis catalyst to the polymerization mixture was a high molecular weight polymer possible. These polymers displayed very different properties to that of random copolymers, with a low $T_m$, 13° C., and essentially no $T_g$ while random copolymers displayed much higher $T_m$ values. Unfortunately, the use of these higher levels of catalyst is undesirable when considering the cost to prepare, the difficulties of removing the catalyst, and the limitations imposed on the applications when relatively large amounts of catalyst are left in the polymer.

Equation 5

The polymerization of methyl ester functional polyethylene is also reported in Schwendeman et al. In this case high molecular weight polymer is formed under normal ADMET conditions. Although, in principle, conversion of the ester to an acid functional group is possible, in practice the hydrolysis of an ester in the resulting polymer does not proceed to a large extent. Therefore, a practical route to prepare a periodic, semi-periodic and semi-random poly(ethylene-co-acrylic acid) and poly(ethylene-co-methacrylic acid) remains.

SUMMARY OF THE INVENTION

A method of preparing periodic, semi-periodic, or semi-random polyethylene-co-acrylic acid or polyethylene-co-methacrylic acid involves combining at least one 1-alkoxyalkyl ester substituted α,Ω-dienes at least one 1-alkoxyalkyl ester substituted cycloalkenes or a mixture thereof and a metathesis catalyst to yield a polymer of formula (3), and hydrogenating the polymer of formula (3) using a hydrogenation catalyst and hydrogen yield periodic, semi-periodic, or semi-random polyethylene-co-acrylic acid or polyethylene-co-methacrylic acid of formula (4), wherein in formulas (3), and (4): x and y are independently 1 to 20; w and z are independently 1 to 5, where w+z is 2 to 6, m and n are 0 to 10,000 where n+m is 50 to 10,000; R and R' are independently an alkyl group of 1 to 6 carbons; and R" is H or an alkyl group of 1 to 6 carbons. In addition to the 1-alkoxyalkyl ester substituted α,Ω-dienes and or 1-alkoxyalkyl ester substituted cycloalkenes α,Ω-dienes and/or cycloalkenes to yield a semi-random polyethylene-co-acrylic acid or polyethylene-co-methacrylic acid where more than 42 methylene units on the average can be inserted between ester substituents. The polymerizations and hydrogenations can be carried out in any solvent compatible with the monomers, catalysts, and other reagents. Polymerization and hydrogenations can be carried out at moderate temperature of about 20 to 100° C. and hydrogenations can be carried out with hydrogen at a pressure of 15 to 500 p.s.i. Grubb's catalyst can be used as the metathesis and Wilkerson's catalyst can be used as the hydrogenation catalyst.

The polyethylene-co-acrylic acid or polyethylene-co-methacrylic acid formed can react with a metal salt of a base or a carboxylate of a volatile carboxylic acid to form an ionomer where the ionic group is, periodically, semi-periodically, or semi-randomly disposed along the polymer chain.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

The inventive method allows the preparation of a polyethylene-co-acrylic acid EAA or a polyethylene-co-methacrylic acid EMAA where the acid functionality is periodically, semi-periodically or semi-randomly disposed along the backbone. As used herein a periodic EAA or EMAA polymer has every methylene unit containing the carboxylic acid substituted methylene units separated by segment of methylene units where ever segment has exactly the same number of methylene units. Unlike a EAA or EMAA prepared by a copolymerization of ethylene with acrylic acid or methacrylic acid where the number of methylene units between the carbons containing the acid unit are always an odd number, the number of methylene units can be even for the EAA and EMAA polymers prepared by the method of the present invention. A semi-periodic EAA or EMAA polymer has only three different segment lengths of methylene units between carboxylic acid substituted methylene units. A semi-random EAA or EMAA polymer has a random distribution of segment lengths of methylene units between carboxylic acid substituted methylene units but the minimal distance between methylene units is no less than four and equal to two times the number of methylene units plus two between the carboxylic acid substituted methylene units and unsaturated carbons of the ene units in the monomers. The method involves the acyclic diene metathesis, ADMET, polymerization of a mono 1-alkoxyalkyl ester substituted α,Ω-diene where the ester substituted carbon is separated from vinyl groups by two alkylene segments, as for structure 1 in FIG. 1, or the ring-opening metathesis polymerization, ROMP, of a mono 1-alkoxyalkyl ester substituted cycloalkene, as for structure 2 in FIG. 1, where the two alkylene segments separate the ester substituted carbon from the ene functionality in the ring. All polymerizations and hydrogenations can be carried out in a solvent. The only restriction on the solvent is that it is compatible with the catalysts, monomers, and reagents employed for the transformation. Those skilled in the art can readily recognize appropriate solvents for use with any given combination of catalysts, monomers, and reagents.

Figure 1:
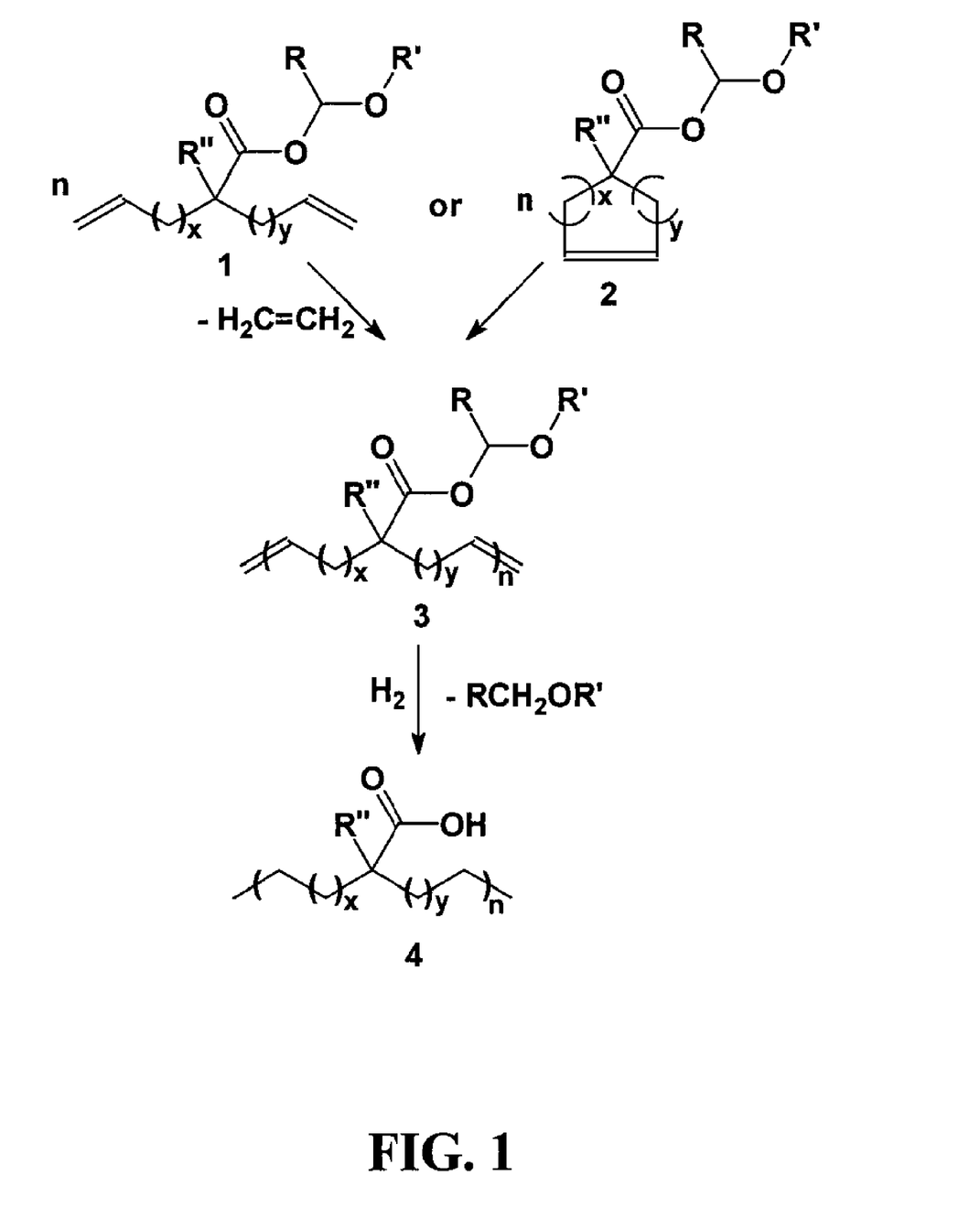
FIG. 1 shows an ADMET polymerization of mono 1-alkoxyalkyl ester substituted α,Ω-diene or a ROMP polymerization of a mono 1-alkoxyalkyl ester substituted cycloalkene to an unsaturated ester polymer and the subsequent hydrogenation/deprotection to a periodic or semi-periodic polyethylene-co-acrylic acid or polyethylene-co-methacrylic acid.

ADMET and ROMP homopolymerization give an unsaturated polymer with periodic or semi-periodic displacement of the ester substituent and an unsaturated site along the backbone of the polymer of structure 3 in FIG. 1. The exposure of this polymer to hydrogenation conditions with an appropriate hydrogenation catalyst, results in the conversion of the unsaturated site to a saturated site and the conversion of the 1-alkoxyalkyl ester to the acid to give the EAA or EMAA, structure 4 in FIG. 1, and a dialkyl ether.

It is to be understood when viewing FIG. 1 that variable x and y represent alkylene segments where every alkylene chain in that polymer has a single specific number of methylene units and do not represent a statistical value which is only an average number of methylene units.

The preparation of the periodic unsaturated polymer is carried out by the ADMET homopolymerization of a symmetric mono 1-alkoxyalkyl ester substituted α,Ω-diene or ROMP homopolymerization of a mono 1-alkoxyalkyl ester substituted cycloalkene where the two alkylene segments are of identical length. If the two alkylene segments are different, an assymetric diene or assymetric cycloalkene, the resulting intermediate unsaturated polymer and the final EAA or EMAA polymer is semi-periodic. For example, if the final polymer is constructed from an asymmetric mono 1-alkoxyalkyl ester substituted α,Ω-diene, which has an alkylene segment of x methylene carbons and an alkylene segment of y methylene carbons, the final EAA or EMAA will have segments of methylene carbons between acid substituted carbons of $2x+2$, $2y+2$, and $x+y+2$ in a ratio of 1 to 1 to 2. Additionally any segment in the final EAA or EMAA of size $2x+2$ or $2y+2$ can not have an adjacent segment of the same size. Alternately, a semi-periodic polymer could be produced from two symmetric mono 1-alkoxyalkyl ester substituted α,Ω-dienes or mono 1-alkoxyalkyl ester substituted cycloalkenes where the two alkylene segments of a given diene or cycloalkene are of identical length, but one diene has a segment length of x and the other a segment length of y. In this case although the final EAA or EMAA will have segments of methylene carbons between acid substituted carbons of $2x+2$, $2y+2$, and $x+y+2$, the ratio of these segments will depend on the proportion of the two dienes or cycloalkenes used and the segments in the final EAA or EMAA of size $2x+2$ or $2y+2$ have adjacent segments of the same size in a frequency proportional to the ratio of the two dienes or cycloalkenes. Hence, where an equimolar amount of symmetric dienes or cycloalkenes are used, one with alkylene segments of sizes x and one with alkylene segments of size y, the final EAA or EMAA will have segments of methylene carbons between acid substituted carbons of $2x+2$, $2y+2$, and $x+y+2$ in a ratio of 1 to 1 to 2 but a segment of size $2x+2$ will have adjacent segments of size $2x+2$ and an equal number of segments of size $2y+2$ will have adjacent segments of size $2y+2$.

Semi-random structures can also be prepared by ADMET, where three or more different mono 1-alkoxyalkyl ester substituted α,Ω-dienes with different alkylene segment lengths are included in the polymerization mixture. Although the ADMET copolymerization process is random, the final EAA and EMAA are not fully random polymers. In these polymers, the minimum distance between acid substituted carbons are 2x+2 when x represents the shortest sequence length in any monomer. These semi-random polymers can also be prepared by the ADMET copolymerization of one or more mono 1-alkoxyalkyl ester substituted $\alpha,\Omega$-dienes with one or mo22 re $\alpha,\Omega$-dienes or mono 1-alkoxyalkyl ester substituted cycloalkenes and one or more cycloalkenes, as shown in FIG. 2.

Figure 2:
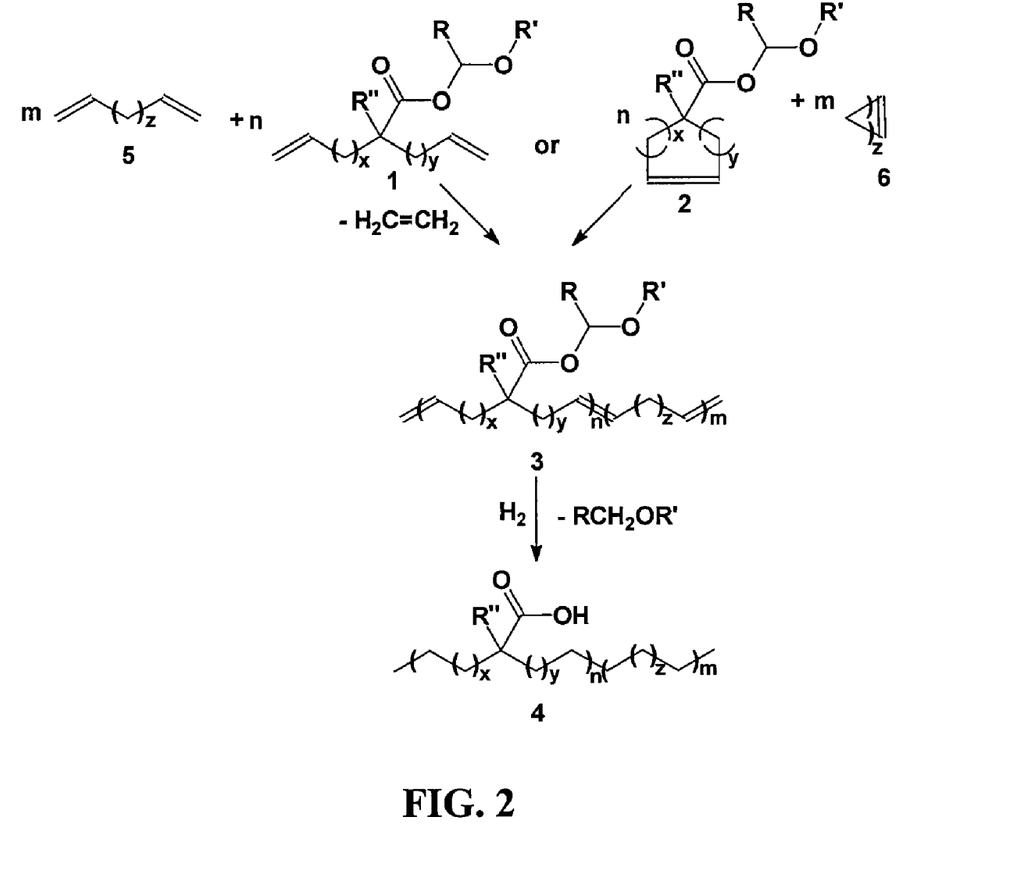
FIG. 2 shows an ADMET copolymerization of a mono 1-alkoxyalkyl ester substituted α,Ω-diene and an α,Ω-alkyldiene or a ROMP polymerization of a mono 1-alkoxyalkyl ester substituted cycloalkene with a cycloalkene to an unsaturated ester copolymer and the subsequent hydrogenation/deprotection to a semi-random polyethylene-co-acrylic acid or polyethylene-co-methacrylic acid.

The facile preparation of such ordered EAA and EMAA polymers was enabled by the discovery that a 1-alkoxyalkyl ester group permits the ready polymerization of a diene or cycloalkene and that the alkoxyalkyl group, structures 1 and 2 in FIG. 1 and FIG. 2, to a previously unknown periodic, semi-periodic, or semi-random terpolymer of ethylene, acetylene, and 1- alkyloxyalkylacrylate or ethylene, acetylene, and 1-aklyloxyalkylmethacrylate, structure 3 of FIG. 1 and FIG. 2. The alkoxyalkyl group of the polymer of structure 3 can subsequently be removed from the polymer permits an effective polymerization to a high molecular weight polymer with a level of order that is easily controlled by selection of the monomer structure and comonomer feed. Unlike the acid substituted equivalents of the 1-alkoxyalkyl ester substituted $\alpha,\Omega$-dienes or cycloalkenes, polymerization does not require high loadings of the metathesis catalyst or periodic addition of the catalyst over the course of a slow polymerization to achieve a moderate to high molecular weight polymer. Furthermore, the conversion of the ester group to the acid group can be carried out by non-hydrolytic means. As the size of the alkylene sequences increases, with the accompanying decrease in the proportion of ester groups, the difficulty of effectively hydrolyzing an ester group increases, significantly limiting the breath of polymer structures available directly from the acid equivalents of the 1-alkoxyalkyl ester substituted $\alpha,\Omega$-dienes or cycloalkenes and introducing a random defect into the final polymer due to incomplete hydrolysis.

The ADMET monomers of this invention, 1-alkoxyalkyl ester substituted $\alpha,\Omega$-dienes are given by structure 1 in FIG. 1, the polymers prepared from 1-alkoxyalkyl ester substituted $\alpha,\Omega$-dienes are given by structure 3 in FIG. 1, and the hydrogenated deprotected EAA and EMAA polymers are given by structure 4 in FIG. 1. In structures 1, 3 and 4, x and y, independently, represent a value of 1 through 20 and n in structures 3 and 4 represents a value of 50 to 10,000. In structures 1 and 3, the group R is an alkyl group of 1 to 6 carbon atoms and R' is an alkyl group of 1 to 6 carbon atoms. In structures 1, 3 and 4, the unit R" is preferably either H or $CH_3$ but can be an alkyl group of up to six carbons.

The ROMP monomers of this invention 1-alkoxyalkyl ester substituted cycloalkenes are given by structure 2 in FIG. 1, the polymers prepared from 1-alkoxyalkyl ester substituted cycloalkenes are given by structure 3 in FIG. 1, and the hydrogenated deprotected EAA and EMAA polymers are given by structure 4 in FIG. 1. In structures 2, 3 and 4, x and y, independently, represent a value of 1 through 5 where x+y is 2 to 6, and n in structures 3 and 4 represents a value of 50 to 10,000. In structures 2 and 3, the group R is an alkyl group of 1 to 6 carbon atoms and R' is an alkyl group of 1 to 6 carbon atoms. In structures 2, 3 and 4, the unit R" is either H or an alkyl group of 1 to 6 carbon atoms.

The ADMET copolymerization of 1-alkoxyalkyl ester substituted $\alpha,\Omega$-dienes with $\alpha,\Omega$-dienes and the ROMP of cycloalkenes with 1-alkoxyalkyl ester substituted alkenes as shown in FIG. 2 also defines: x and y, independently, represent a value of 1 through 5, n represents a value of 5 to 10,000, the groups R and R' are independently alkyl groups of 1 to 6 carbon atoms and R" is either H or alkyl groups of 1 to 6 carbon atoms. The variable z in structures 3, 4, 5 and 6 represents a value of 1 to 20 and m is a value of 5 to 10,000 such that n+m is a value of 50 to 10,005.

The inclusion of the acid unit into the periodic, semi-periodic and semi-random EAA and EMAA copolymers provide polymeric materials with high tensile strength. Tensile strengths equal to or greater than 4,000 psi with elongations to break equal to or greater than 400% is typical for a periodically placed acid group with approximately 10 mol percent acrylic acid equivalency.

The periodic, semi-periodic and semi-random EAA and EMAA copolymers are converted into ionomer by their neutralization with a base or the exchange with a metal carboxylate. For example, a zinc acetate solution can be combined with the EAA and EMAA copolymers to yield acetic acid and the ionomer with zinc carboxylate units in the copolymer.

EXAMPLES

The present invention is further illustrated by the following specific Examples, which should not be construed as limiting the scope or content of the invention in any way.

Example 1

A solution of 2-(4-pentenyl)-6-hepteneoic acid (1 eq.) in diethyl ether (20 mL) was slowly added via a Pasteur pipette to a precooled (0° C.) solution of ethyl vinyl ether (excess, usually >4 eq.) and phosphoric acid (cat., 1 drop from capillary pipette) in diethyl ether (10 mL). The solution was stirred cold for 30 minutes under argon, and then warmed to room temperature for 3 days. Basic alumina (~1 g) was added to the reaction mixture and stirred for five minutes. After filtration and solvent removal, 1-ethoxyethyl-2-(pent-4-enyl)hept-6-enoate was isolated as 7.3 g (99.0% yield) of colorless oil with no further purification required. $^1$H NMR ($CDCl_3$): δ (ppm) 1.22 (t, 3H) 1.30-1.55 (br, 9H), 1.62 (m, 2H), 2.05 (q, 4H), 2.36 (m, 1H), 3.53 (d, 1H), 3.71 (m, 1H), 4.97 (m, 4H), 5.82 (m, 2H), 5.94 (q, 1H); $^{13}$C NMR ($CDCl_3$): δ (ppm) 15.24, 21.14, 26.86, 26.89, 31.91, 32.10, 33.76, 45.98, 64.77, 96.33, 114.92, 138.56, 176.17. In like manner 1,2-(7-octenyl)-9-deceneoic acid was converted into 1-ethoxyethyl-2-(oct-7-enyl)dec-9-enoate (99.1% yield). $^1$H NMR ($CDCl_3$): δ (ppm) 1.16-1.53 (br, 24H), 1.61 (m, 2H), 2.04 (q, 4H), 2.34 (m, 1H), 3.53 (m, 1H), 3.71 (m, 1H), 4.97 (m, 4H), 5.81 (m, 2H), 5.95 (q, 1H); $^{13}$C NMR ($CDCl_3$): δ (ppm) 15.24, 21.13, 27.59, 27.65, 29.03, 29.15, 29.58, 32.52, 32.71, 33.94, 46.30, 64.72, 96.22, 114.41, 139.27, 176.42. In like manner to Example 1, 2-(10-undecenyl)-12-trideceneoic acid was converted into 1-ethoxyethyl-2-(undec-10-enyl)tridec-12-enoate (98.4% yield). $^1$H NMR ($CDCl_3$): δ (ppm) 1.16-1.53 (br, 36H), 1.60 (m, 2H), 2.04 (q, 4H), 2.33 (m, 1H), 3.54 (m, 1H), 3.71 (m, 1H), 4.97 (m, 4H), 5.81 (m, 2H), 5.95 (q, 1H); $^{13}$C NMR ($CDCl_3$): δ (ppm) 15.24, 21.13, 27.59, 27.65, 29.03, 29.15, 29.58, 32.52, 32.71, 33.94, 46.30, 64.72, 96.22, 114.41, 139.27, 176.42.

Example 2

In like manner to Example 1, 2-(4-cyclooctenyl)acetic acid was converted into 1-ethoxyethyl-2-(cyclo-4-octenyl)acetate. $^1$H NMR ($CDCl_3$): δ (ppm) 1.19 (t, 3H), 1.40 (d, 3H), 1.51-1.79 (br, 3H), 1.98-2.25 (br, 4H), 2.38 (m, 1H), 2.47 (m, 1H), 3.52 (m, 1H), 3.69 (m, 1H), 5.66 (m, 2H), 5.92 (q, 1H); $^{13}$C NMR ($CDCl_3$): δ (ppm) 15.26, 21.02, 24.32, 26.08, 26.11, 28.02, 29.51, 29.63, 31.77, 31.91, 43.86, 64.72, 64.78, 96.18, 129.71, 129.75, 130.74, 130.81, 177.55, 177.57.

Example 3

2-(4-pentenyl)-6-hepteneoic acid (1 g) was added to a 50 mL round bottomed flask equipped with a magnetic stir bar and degassed by stirring under high vacuum for one hour. Grubbs first generation catalyst (400:1 monomer:catalyst) was added to the flask, and high vacuum ($10^{-4}$ torr) was applied slowly over one hour then, the temperature was raised to 50° C. for 72 hours. Upon cooling the room temperature, ethyl vinyl ether (~10 drops) in toluene (50 mL) was added to the polymerization flask and stirred until all solids dissolved. Precipitation of the crude solution into slightly acidic (1M HCl) MeOH (500 mL) and subsequent filtration followed by vacuum drying afforded 987 mg of unsaturated polymer as brown tacky solid. $^1$H NMR (300 MHz, CDCl$_3$): δ 5.8 (m, 1H) 5.38 (m, 40.03H); 5.05 (m, 1.99H) 2.40 (m, 41.2H), 2.06 (m, 81.43H), 1.7-1.2 (m, 170.54H); IR (ν, cm$^{-1}$): 2920, 2850, 1702, 1649, 966.

Example 4

In like manner to Example 3, 1-ethoxyethyl-2-(pent-4-enyl)hept-6-enoate was polymerized. $^1$H NMR (CDCl$_3$): δ (ppm) 1.16-1.51 (br, 12H), 1.60 (m, 2H), 1.97 (q, 4H), 2.33 (m, 1H), 3.53 (m, 1H), 3.70 (m, 1H), 5.35 (m, 2H), 5.94 (q, 1H); $^{13}$C NMR (CDCl$_3$): δ (ppm) 15.27, 21.15, 27.31, 27.62, 32.09, 32.29, 32.65, 46.06, 64.73, 96.26, 129.83, 130.32, 176.21; FT-IR: (cm$^{-1}$) 2978, 2926, 2854, 1733, 1704, 1464, 1376, 1124, 1039, 948, 965, 849, 723. In like manner, 1-ethoxyethyl-2-(oct-7-enyl)dec-9-enoate was polymerized. $^1$H NMR (CDCl$_3$): δ (ppm) 1.16-1.51 (br, 24H), 1.60 (m, 2H), 1.95 (q, 4H), 2.32 (m, 1H), 3.53 (m, 1H), 3.71 (m, 1H), 5.35 (m, 2H), 5.95 (q, 1H); $^{13}$C NMR (CDCl$_3$): δ (ppm) 15.25, 21.14, 27.41, 27.66, 27.72, 29.27, 29.40, 29.64, 29.79, 29.91, 32.60, 32.79, 46.36, 64.72, 96.20, 130.02, 130.49, 176.46; FT-IR: (cm$^{-1}$) 2977, 2926, 2852, 1732, 1704, 1463, 1376, 1124, 1037, 948, 965, 852, 721. In like manner, 1-ethoxyethyl-2-(undec-10-enyl)tridec-12-enoate was polymerized. $^1$H NMR (CDCl$_3$): δ (ppm) 1.30-1.51 (br, 36H), 1.60 (m, 2H), 1.96 (q, 4H), 2.32 (m, 1H), 3.53 (m, 1H), 3.71 (m, 1H), 5.38 (m, 2H), 5.95 (q, 1H); $^{13}$C NMR (CDCl$_3$): δ (ppm) 15.26, 21.15, 27.45, 27.70, 27.75, 29.42, 29.55, 29.90, 30.00, 32.84, 46.37, 64.71, 96.19, 130.02, 130.08, 130.54, 176.46; FT-IR: (cm$^{-1}$) 2978, 2925, 2854, 1732, 1705, 1463, 1378, 1124, 1037, 948, 966, 852, 722.

Example 5

A solution of the polymer from Example 3 (1.0 g, 4.45 mol olefin) was dissolved in a toluene (100 mL) and 1-butanol (50 mL) mixture and then degassed by bubbling a nitrogen purge through the stirred solution for 30 minutes. Solid Wilkinson's catalyst (3.7 mg, 4 µmol) [RhCl(PPh$_3$)$_3$] was added to the solution, and the glass sleeve was sealed in a Parr reactor equipped with a temperature probe, pressure gauge, and a paddle wheel stirrer. The reactor was filled to 400 p.s.i. hydrogen gas and purge three times while stirring, filled to 400 psi hydrogen, and heated to 80° C. for 48 hours. Upon cooling to room temperature and safely releasing pressure using a vent valve, the crude solution was precipitated into methanol, filtered, and dried affording 994 mg (99% yield) of saturated EAA copolymer. FT-IR (ν, cm$^{-1}$): 2920, 2850, 1702, 1461, 721.

Example 6

In like manner to Example 5, solutions of the polymers from Example 4 were hydrogenated to yield a saturated EAA copolymer. The polymer from 1-ethoxyethyl-2-(pent-4-enyl)hept-6-enoate: $^1$H NMR (dioxane): δ (ppm) 1.19-1.65 (br, 16H), 2.24 (m, 1H); $^{13}$C NMR (dioxane): δ (ppm) 28.21, 30.21, 30.27, 30.36, 33.14, 45.93, 177.41; FT-IR (ν, cm$^{-1}$): 2921, 2852, 1704, 1461, 1418, 1287, 1235, 931, 721. The polymer from 1-ethoxyethyl-2-(oct-7-enyl)dec-9-enoate: $^1$H NMR (dioxane): δ (ppm) 1.20-1.65 (br, 28H), 2.24 (m, 1H); $^{13}$C NMR (dioxane): δ (ppm) 28.21, 30.28, 30.38, 30.43, 33.10, 45.89, 177.43; FT-IR (ν, cm$^{-1}$): 2921, 2852, 1704, 1461, 1417, 1288, 1234, 930, 721. The polymer from 1-ethoxyethyl-2-(undec-10-enyl)tridec-12-enoate: $^1$H NMR (dioxane): δ (ppm) 1.07-1.65 (br, 40H), 2.25 (m, 1H); $^{13}$C NMR (THF): δ (ppm) 28.60, 30.69, 30.85, 33.57, 46.32, 177.29; FT-IR (ν, cm$^{-1}$): 2920, 2851, 1704, 1461, 1419, 1288, 1235, 933, 723.

Example 7

Distilled cyclooctene (1.43 g, 13.0 mmol) was syringed into a 10 mL oven dried vial with a stir bar. 2-(4-Cyclooctenyl)acetic acid (1.78 g, 11.6 mmol) and chloroform (10 mL) was added to the vial and the mixture was stirred for 30 minutes under a stream of nitrogen. Grubbs' second-generation catalyst (8.6 mg, $1.01\times10^{-2}$ mmol) in chloroform (0.5 mL) was added via syringe to the vigorously stirred vial. After stirring at room temperature until the solution became highly viscous and warm to the touch, the polymerization mixture was allowed to stand overnight under a nitrogen gas. The polymerization was quenched by the addition of ethyl vinyl ether (~10 drops) in chloroform (10 mL) with 2,6-di-tert-butyl-4-methylphenol (5 mg) included as a radical scavenger to prevent crosslinking. Upon isolation of the extremely adhesive polymer from the precipitation, the unsaturated material was only analyzed by GPC due to disappointing molecular weights attained by free acid ROMP. In this manner a 15 mol % EAA unsaturated precursor was achieved. FT-IR (ν, cm$^{-1}$): 2926, 2854, 1705, 1649, 966; $^1$H NMR (CDCl$_3$): δ 5.50 (br, 16.43), 2.40 (br, 1H), 2.06 (br, 33.12H), 1.7-1.3 (br, 65.23). In like manner by increasing the proportion of cyclooctene to 2-(4-cyclooctenyl)acetic acid a 9 mol % EAA unsaturated precursor was achieved. FT-IR (ν, cm$^{-1}$): 2926, 2855, 1705, 1649, 966; $^1$H NMR (CDCl$_3$): δ 5.50 (br, 5.53), 2.40 (br, 1H), 2.06 (br, 11.14H), 1.7-1.3 (br, 20.45). In like manner by increasing the proportion of cyclooctene to 2-(4-cyclooctenyl)acetic acid a 3 mol % EAA unsaturated precursor was achieved. FT-IR (ν, cm$^{-1}$): 2920, 2850, 1705, 1649, 966; $^1$H NMR (CDCl$_3$): δ 5.50 (br, 3.27H), 2.40 (br, 1H), 2.06 (br, 6.54H), 1.7-1.3 (br, 11.08H).

Example 8

A solution of 15 mole % EAA unsaturated precursor of Example 7 (1.0 g, 8.78 mmol olefin) was dissolved in xylenes (30 mL) in a 350 mL three-neck round bottomed flask. Tripropyl amine (3.79 g, 26.3 mmol) was added via syringe followed by addition of p-toluenesulfonhydrazide (4.33 g, 23.3 mmol) using a powder funnel. The reaction mixture was heated to 135° C. for 2 hours with vigorous stirring while monitoring nitrogen production with a mineral oil bubbler. Upon cessation of nitrogen production and cooling to room temperature, a second batch of equivalent amounts of tripropyl amine and p-toluenesulfonhydrazide was added and the reaction mixture was heated to 135° C. for 2 hours. Reprecipitation of crude mixtures into acidic (1M HCl) methanol, followed by filtration and subsequent drying afforded the saturated EAA copolymer analog as a 910 mg (90% yield) of white powder. FT-IR (ν, cm$^{-1}$): 2917, 2848, 1700, 1460. In like manner the 9% EAA unsaturated precursor and 3% unsaturated precursor were hydrogenated to give saturated EAA. All displayed the same peak positions in their FT-IR spectra.

Example 9

Cyclooctene (0.55 g, 5.0 mmol) and 1-ethoxyethyl-2-(cyclo-4-octenyl)acetate (9.00 g, 39.7 mmol), prepared as in Example 2, were added toluene (30 mL) in a 200 mL round bottomed flask under nitrogen purge. The reaction mixture was heated to 50° C., and a solution of Grubbs' first generation catalyst (53 mg, 6.4 μmol, 1000:1 monomer:catalyst) in dichloromethane (0.5 mL) was added to the magnetically stirred reaction mixture. After four hours, the polymerization mixture was quenched by addition of ethyl vinyl ether (~10 drops) and allowed to stir for 5 minutes. Upon precipitation of crude solution into acidic (1M HCl) methanol, the 22.2 mol % EAA unsaturated precursor was isolated as a mildly adhesive solid. No further purification of unsaturated prepolymers was necessary. $^{13}$C NMR (CDCl$_3$): δ (ppm) 15.27, 21.16, 27.31, 27.61, 32.10, 32.30, 32.66, 46.08, 64.73, 96.26, 129.84, 130.33, 176.21; FT-IR: (cm$^{-1}$) 2978, 2926, 2854, 1733, 1704, 1464, 1375, 1124, 1039, 949, 966, 849, 723. In like manner a 13.3 mol % EAA precursor was prepared using a higher proportion of cyclooctene. $^{13}$C NMR (CDCl$_3$): δ (ppm) 15.27, 21.16, 27.30, 27.61, 32.10, 32.30, 32.66, 46.10, 64.73, 96.26, 129.85, 130.33, 176.21; FT-IR: (cm$^{-1}$) 2980, 2926, 2853, 1733, 1704, 1464, 1376, 1122, 1041, 948, 966, 849, 723. In like manner a 9.5 mol % EAA precursor was prepared. $^{13}$C NMR (CDCl$_3$): δ (ppm) 15.26, 21.16, 27.31, 27.61, 32.10, 32.30, 32.66, 46.08, 64.73, 96.27, 129.84, 130.33, 176.21; FT-IR: (cm$^{-1}$) 2978, 2927, 2854, 1733, 1704, 1464, 1375, 1125, 1039, 948, 965, 849, 721. In like manner a 4.5 mol % EAA precursor was prepared. $^{13}$C NMR (CDCl$_3$): δ (ppm) 15.27, 21.15, 27.31, 27.61, 32.11, 32.30, 32.66, 46.08, 64.73, 96.25, 129.84, 130.31, 176.21; FT-IR: (cm$^{-1}$) 2978, 2926, 2855, 1733, 1705, 1464, 1376, 1124, 1039, 948, 965, 849, 722.

Example 10

Using the conditions of example 5 with the exception that the temperature was maintained at 100° C. rather than 80° C., the unsaturated EAA precursors of Example 15 were hydrogenated to EAA polymers. The position of the peaks in the were virtually identical in position for all copolymers FT-IR (ν, cm$^{-1}$): 2920, 2850, 1704, 1460, 719.

Example 11

The analysis of the EAA copolymers prepared via the ADMET and ROMP polymerization of acid containing monomers in Examples 5 and 8 was carried out by Gel permeation chromatography (GPC). GPC was performed using a Waters Associates GPCV2000 liquid chromatography system with its internal differential refractive index detector (DRI) at 40° C. using two Waters Styragel HR-5E columns (10 microns PD, 7.8 mm ID, 300 mm length) with HPLC grade THF as the mobile phase at a flow rate of 1.0 mL/minute. Injections were made at 0.05-0.07% w/v sample concentrations using a 220.5 μl injection volume. Retention times were calibrated against narrow molecular weight polystyrene standards (Polymer Laboratories; Amherst, Mass.). As can be seen in Table 1 only low molecular weight polymers were achieved.

TABLE 1

Molecular weight data for ADMET and ROMP unsaturated free acid copolymers

| EAA Copolymer | Acrylic Acid Content (mol %) | $M_n$ (g/mol) | PDI |
|---|---|---|---|
| Example 5 | 22.2 | 2800 | 1.45 |
| Example 8 | 3.0 | 4200 | 1.76 |
| Example 8 | 9.0 | 5700 | 1.95 |
| Example 8 | 15.0 | 9800 | 1.83 |

Example 12

GPC was carried out as in Example 11 for the EAA precursors prepared in Examples 4 and 9. As the ADMET and ROMP were carried out on the 1-alkoxyalkyl ester substituted monomers, a tenfold increase in the polymer molecular weight was achieved as shown in Table 2. The hydrogenated polymers, EAA's, were insoluble and GPC could not be carried out on these hydrogenated copolymers.

TABLE 2

Molecular weight data for protected, unsaturated EAA precursors

| | GPC data | | |
|---|---|---|---|
| Unsaturated Copolymer | $M_n$ | $M_w$ | PDI |
| Example 4 (-6-enoate) | 25,000 | 40,800 | 1.62 |
| Example 4 (-9-enoate) | 31,800 | 59,100 | 1.86 |
| Example 4 (-12-enoate) | 37,700 | 65,200 | 1.73 |
| Example 9 22.2% | 85,000 | 106,200 | 1.25 |
| Example 9 13.3% | 80,500 | 111,100 | 1.38 |
| Example 9 9.5% | 85,400 | 163,900 | 1.41 |
| Example 9 4.5% | 93,600 | 128,200 | 1.37 |

Example 13

Secondary structure analysis of EAA materials was performed applying small angle x-ray scattering, SAXS, to probe molecular-level order. SAXS analysis of secondary structure in the EAA prepared in Example 6 from 1-ethoxyethyl-2-(undec-10-enyl)tridec-12-enoate, labeled EAA21, exhibited semicrystallinity.

Figure 3:
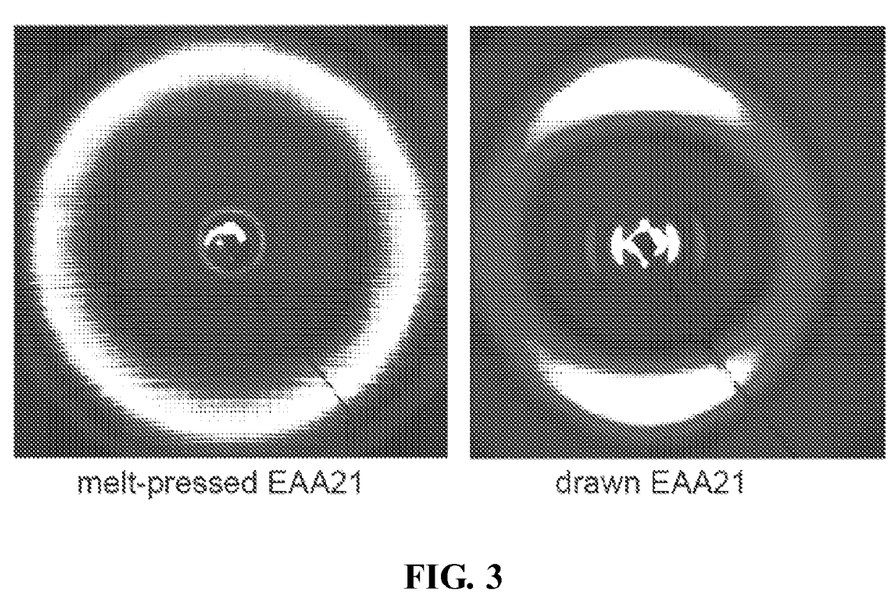
FIG. 3 shows a SAXS pattern of a melt pressed periodic poly(ethylene-co-acrylic acid) with 20 methylene units between each carboxylic acid substituted methylene unit of the polymer in a melt pressed sample (left) and a drawn sample.

FIG. 3 illustrates two samples of the EAA from 1-ethoxyethyl-2-(undec-10-enyl)tridec-12-enoate displaying the respective scattering patterns for a melt-pressed sample and a drawn sample. The melt-pressed copolymer exhibits a broad amorphous halo at small length scales indicating a mostly disordered structure throughout the sample. The small ring towards the center of the melt-pressed sample is unique to sequenced ADMET materials and has never been seen in any EAA copolymers to date. Scattering at this angle corresponds roughly to 2.7 nm, the spacing of acid moieties along the copolymer backbone. Interestingly, this data suggests ordering of the acid units even though the broad amorphous halo attributed to disordered polyethylene chains suggests otherwise.

A drawn sample of the same material was analyzed in a similar fashion to the melt-pressed sample. The drawing of the bulk material forces added orientation into the polymer matrix along the draw axis, which is in the vertical direction in the FIG. 3. The shift of the amorphous contribution into an elliptical scattering pattern indicates a low degree of crystalline order in the material as amorphous scattering perpendicular to the orientation axis prevails. Also ordered perpendicularly to the draw axis are the low angle reflections associated with the inter-acid distance along the polymer backbone.

Example 14

Differential scanning calorimetry (DSC) was performed on vacuum dried EAA copolymers to ensure complete removal of solvent prior to analysis. Thermal profiles for ADMET and ROMP materials are presented in FIGS. 4 and 5, respectively, indicating the drastic effects of sequence length distribution on bulk copolymer morphology.

Figure 4:
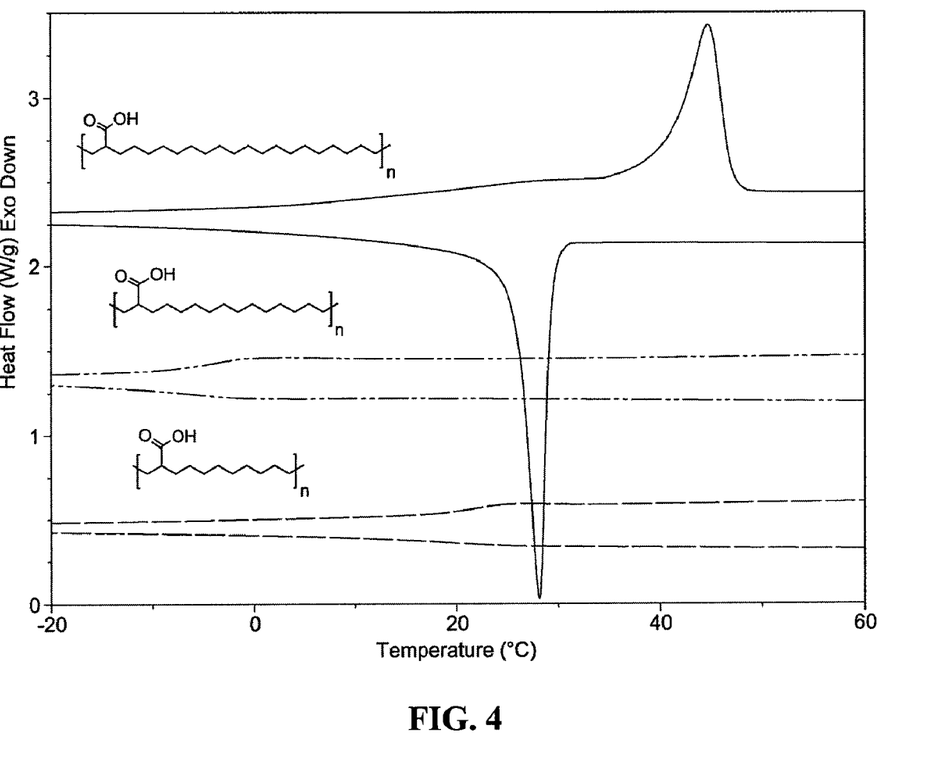
FIG. 4 shows DSC plots of heat flow vs. temperature on heating and cooling for periodic poly(ethylene-co-acrylic acid)s for samples with 20 methylene units (top), 14 methylene units (middle), and 10 methylene units (bottom), between each carboxylic acid substituted methylene unit.

DSC analysis for EAA copolymers produced by ADMET, shown in FIG. 4, is typical for most sequenced materials, where decreasing the pendant branch frequency yields less crystalline materials to some point where completely amorphous copolymers are isolated due to increased steric congestion and a lack of polymer nucleation. For the EAA series of polymers prepared in Experiment 6, only the polymer with 21 methylene units between carboxylic acid substituted methylene units displays melting behavior as indicated by a large endothermic transition at 45° C. exhibiting a heat of fusion of 37 J/g, while those with 10 and 15 display fully amorphous character exhibiting clearly visible glass transition temperatures at 22° C. and −4° C., respectively. The fact that the polymer with 10 methylene units between carboxylic acid units is a more rigid polymer is intuitive as the higher molar concentration of dimerized acid groups leads to extremely stiff polymer chains relative to the polymer with 15 methylene units. The boundary of amorphous and semicrystalline copolymers in this family of sequenced materials resides at a longer branch frequency than most ADMET copolymers series indicating the detrimental effects of hydrogen bonding on polymer crystallization.

Figure 5:
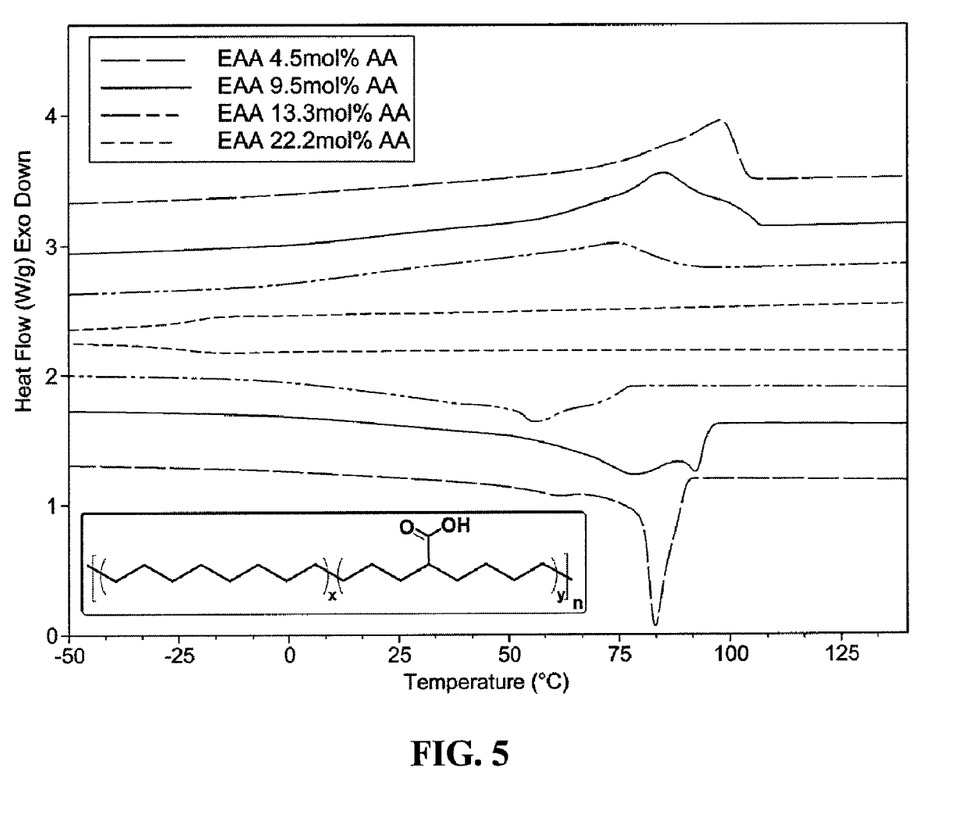
FIG. 5 shows DSC plots heat flow vs. temperature on heating (top for each pair of lines) and cooling (bottom for each pair of lines) for semi-random poly(ethylene-co-acrylic acid)s for samples with a minimum of 6 methylene units between each carboxylic acid substituted methylene unit and an average of 90 methylene units (EAA 4.5 mol % AA), 43 methylene units (EAA 9.5 mol % AA), 31 methylene units (EAA 13.3 mol % AA), and 19 methylene units (EAA 22.2 mol % AA), between each carboxylic acid substituted methylene unit.
Figure 6:
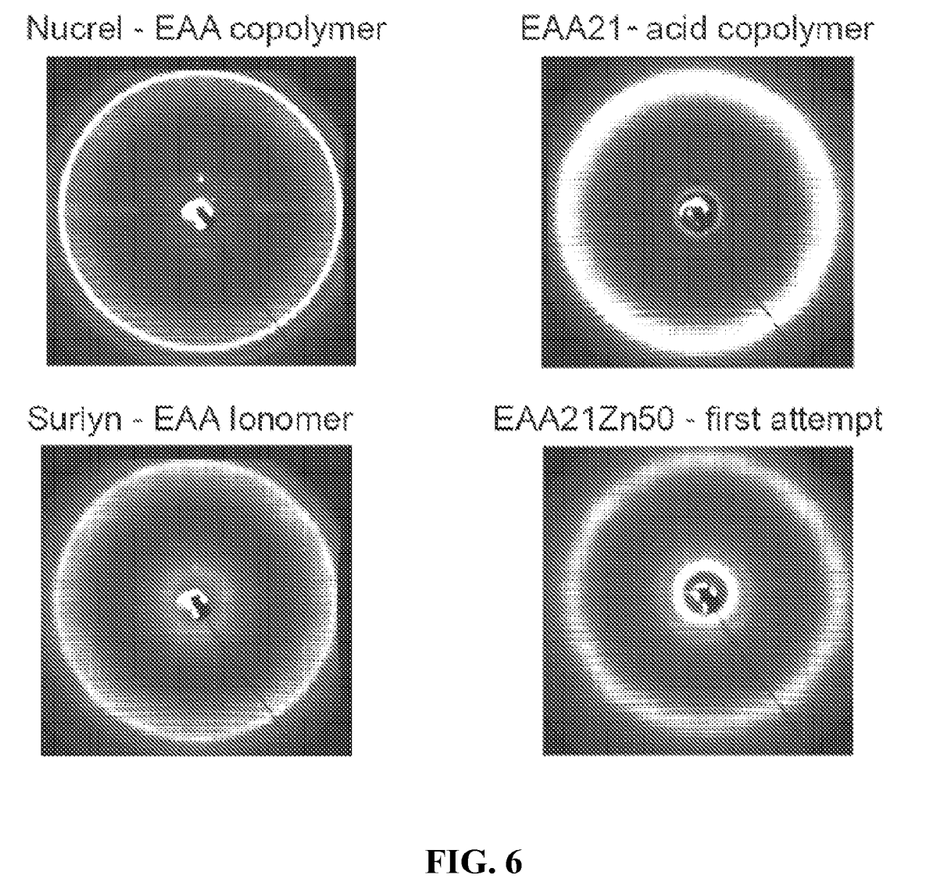
FIG. 6 shows a SAXS pattern of a melt pressed periodic poly(ethylene-co-acrylic acid) with 20 methylene units between each carboxylic acid substituted methylene unit of the polymer (top right) and the 50 Zn to 100 carboxylate ionomer from it (bottom right) as compared to a commercially available poly(ethylene-co-acrylic acid) Nucrel™ (top left) and it associated ionomer SURLYN™ (bottom left).

DSC analysis of ROMP prepared materials of Experiment 10, shown in FIG. 5, display an increase in peak melting temperature and heat of fusion with a decrease in acid content. Although the limited sequence lengths created during ROMP polymerization seem to have little effect on polymer morphology up to 13.3 mol % acrylic acid, the 22.2 mol % acrylic acid copolymer is completely amorphous on first and second scans where commercially available material of similar acid content maintain semicrystallinity due to the presence of long, uninterrupted ethylene sequences and closely associated acid units in the polymer chain. The presence of associating acid units throughout the material where each acid tends to be separated by at least 6 to 8 carbons creates many short ethylene run lengths that are unable to crystallize in the dense hydrogen bonded matrix of the 22.2 mol % acrylic aid copolymer.

Example 15

Zinc acetate (72 mg, 3.9 mmol) was dissolved in a 1:1 mixture of dioxane and 1-butanol (30 mL) by stirring at 60° C. overnight. Upon transfer to an addition funnel, the zinc solution was added quickly to a vigorously stirred solution of the EAA polymer of Experiment 6 with 21 methylene units between carboxylic acid substituted methylene units (540 mg, 16.0 mmol) in a 1:4 mixture of dioxane and 1-butanol (100 mL) at 90° C. to have a mixture where there were 25 Zn ions per 100 carboxylate groups. A fine white precipitate was observed upon partial addition of salt solution, and upon complete addition, the cloudy mixture was allowed to stir for 3 hours. The reaction was cooled and methanol (200 mL) was added causing more precipitate formation and product coagulation. The mixture was allowed to stir for 15 minutes then, ionomer particles were filtered from the mixture, washed with warm methanol, and vacuum dried at 110° C. for 24 hours. In like manner zinc acetate was added to the polymer such that the ratio of 50 Zn ions to 100 carboxylate groups and 75 Zn ions to 100 carboxylate groups with the polymer with 21 methylene units between carboxylate groups. In like manner the EAA polymers of Experiment 6 with 15 and 10 methylene units between carboxylic acid substituted methylene units was used to form an ionomer where there was a ratio of 25 Zn ions to 100 carboxylate groups. All ionomers were stored under argon in a desiccator prior to analysis. The FT IR analyses are given below.

EAA21Zn25 FT-IR: ($cm^{-1}$) 2928, 2852, 1706, 1630, 1547, 1466, 1427, 942, 719.

EAA21Zn50 FT-IR: ($cm^{-1}$) 2928, 2852, 1705, 1630, 1547, 1465, 1427, 941, 721.

EAA21Zn75 FT-IR: ($cm^{-1}$) 2925, 2855, 1706, 1633, 1550, 1464, 1428, 940, 721.

EAA15Zn25 FT-IR: ($cm^{-1}$) 2938, 2851, 2679, 1737, 1706, 1631, 1549, 1466, 1429, 1330, 938, 721.

EAA9Zn25 FT-IR: ($cm^{-1}$) 2922, 2854, 2679, 1736, 1706, 1628, 1549, 1461, 1428, 1330, 945, 721.

SAXS analysis of a wide variety of ionomeric materials has been performed as researchers probe commercial materials to delineate ionic clustering phenomena as associated with polymer crystallinity. FIG. 7 shows a side-by-side comparison of SAXS data for a commercial SURLYN™ ionomer, and the periodic ionomer, EAA21Zn50, and their respective parent acid copolymers. The data for the Nucrel copolymer clearly indicates the presence of amorphous and crystalline regions of the hydrocarbon backbone by the appearance of an broad halo from amorphous scattering overlapping with a sharp reflection attributed to polyethylene-like lamellae. Upon neutralization, the sharp reflection and amorphous halo broaden with the appearance of a new amorphous halo attributed to ionic aggregates dispersed throughout the polymer matrix.

The significant morphology differences between commercial ethylene copolymer and ionomer and the periodic EAA21 polymer and ionomer EAA21Zn50 is the indication of long-range ordering by the presence of a scattering halo near the origin of the diagram. Upon neutralization of EAA21 to EAA21Zn50, little changes with respect to the amorphous scattering from the polymer backbone occur, and the appearance of an amorphous halo, similar to that seen for SURLYN™, indicates successful neutralization for EAA21. Interestingly, the amorphous scattering halo attributed to ionic aggregates is overlapped in EAA21Zn50 by an intense scattering at the same length scale that suggest possible ordering of ionic species due to the regular periodic structure.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A method of preparing periodic, semi-periodic, or semi-random polyethylene-co-acrylic acid or polyethylene-co-methacrylic acid comprising the steps of:

providing a mixture comprising at least one 1-alkoxyalkyl ester substituted $\alpha,\Omega$-diene monomer of formula (1), at least one 1-alkoxyalkyl ester substituted cycloalkene monomer of formula (2), or a mixture thereof and a metathesis catalyst, (1)

(2)

polymerizing the monomers of said mixture to give a polymer of formula (3), and (3)

hydrogenating by introducing a hydrogenation catalyst and hydrogen to the polymer of formula (3) to yield periodic, semi-periodic, or semi-random polyethylene-co-acrylic acid or polyethylene-co-methacrylic acid of formula (4), (4)

wherein in formulas (1), (2), (3), and (4): x and y are independently 1 to 20; w and z are independently 1 to 5, where w+z is 2 to 6, m and n are independently 0 to 10,000 where n+m is 50 to 10,000; R and R' are independently an alkyl group of 1 to 6 carbons; and R" is H or an alkyl group of 1 to 6 carbons.

2. The method of claim 1, wherein said mixture further comprises at least one α,Ω-diene monomer of formula (5), at least one cycloalkene monomer of formula (6), or a mixture thereof to said providing step and said polymerizing step to yield a polymer of formula (7) that yields upon hydrogenation a semi-random polyethylene-co-acrylic acid or polyethylene-co-methacrylic acid of formula (8), wherein for formulas (1), (2) (5), (6), (7) and (8): u is 3 to 6; x and y are independently 1 to 20; w and z are independently 1 to 5, where w+z is 2 to 6, m, n and p are independently 0 to 10,000 where n+m are 1 to 5,000 and n+m+p is 50 to 10,000; R and R' are independently an alkyl group of 1 to 6 carbons; and R" is H or an alkyl group of 1 to 6 carbons.

3. The method of claim 1, wherein said mixture further comprises a solvent.

4. The method of claim 1, wherein polymerizing step is carried out in a temperature range from about 20 to about 100° C.

5. The method of claim 1, wherein the metathesis catalyst is Grubb's catalyst.

6. The method of claim 1, wherein said hydrogenating is carried out in a temperature range from about 20 to about 100° C.

7. The method of claim 1, wherein said hydrogenating step is carried out at a hydrogen pressure of about 15 to about 500 p.s.i.

8. The method of claim 1, wherein the hydrogenation catalyst is Wilkerson's catalyst.

9. The method of claim 1, further comprising a step of neutralizating wherein a metal salt of a base or a carboxylate of a volatile carboxylic acid is mixed with said periodic, semi-periodic, or semi-random polyethylene-co-acrylic acid or polyethylene-co-methacrylic acid to yield an ionomer.

10. A polymer comprising a formula:

wherein u is 3 to 6; x and y are independently 1 to 20; w and z are independently 1 to 5, where w+z is 2 to 6, m, n and p are independently 0 to 10,000 where n+m are 1 to 5,000 and n+m+p is 50 to 10,000; R and R' are independently an alkyl group of 1 to 6 carbons; and R" is H or an alkyl group of 1 to 6 carbons; and wherein the carbons containing the R" group is periodically, semi-periodically, or semi-randomly positioned along the polymer chain.

11. A polymer comprising the formula:

wherein: x =y and are 3 to 20; n is 50 to 10,000; R" is H; M is hydrogen or a metal ion; and a is 1 to 4 and wherein the carbons containing the R" group is periodically positioned along the polymer chain.

12. The polymer of claim 11, wherein M is Zn.

13. A polymer comprising the formula:

wherein: x≠y and x and y are independently 3 to 20; n is 50 to 10,000; R" is H or an alkyl group of 1 to 6 carbons; M is hydrogen or a metal ion; and a is 1 to 4 and wherein the carbons containing the R" group is semi-periodically positioned along the polymer chain.

14. The polymer of claim 13, wherein M is Zn.

* * * * *

UNITED STATES PATENT AND TRADEMARK OFFICE
CERTIFICATE OF CORRECTION

PATENT NO. : 7,858,710 B2
APPLICATION NO. : 12/298584
DATED : December 28, 2010
INVENTOR(S) : Kenneth Boone Wagener et al.

It is certified that error appears in the above-identified patent and that said Letters Patent is hereby corrected as shown below:

Column 1,
Line 1, "HIGHLY ORGANIZED POLYOLEFIN STRUCTURES

FIELD OF THE INVENTION" should read

--HIGHLY ORGANIZED POLYOLEFIN STRUCTURES

The subject invention was made with government support under a research project supported by National Science Foundation, Grant No. 031411. The government has certain rights to this invention.

CROSS-REFERENCE TO RELATED APPLICATIONS

The present application is the U.S. National Stage Application of International Patent Application No. PCT/US2007/067187, filed on April 23, 2007, which claims the benefit of U.S. Provisional Application Serial No. 60/794,616, filed April 25, 2006, both of which are hereby incorporated by reference herein in their entirety, including any figures, tables, or drawings.

FIELD OF THE INVENTION--.

Column 2,
Line 12, should read

Signed and Sealed this
Third Day of May, 2011

David J. Kappos
*Director of the United States Patent and Trademark Office*

CERTIFICATE OF CORRECTION (continued)
U.S. Pat. No. 7,858,710 B2

--                               --.

Column 6,
Lines 22-23, "methylene units.
   The preparation" should read --methylene units. On the other hand, the variables n in Fig. 1 represents a statistical value and represents an average number of units.
   The preparation--.

Column 7,
Lines 4-5, "one or mo22 re" should read --one or more--.

Column 15,
Line 58, "R" is II" should read --R" is H--.

Column 17,
Lines 9-15,

"                               "

should read

--                               --.

Column 18,
Line 30, "of claim 13" should read --of claim 11--.